United States Patent
Mello

[15] 3,680,816
[45] Aug. 1, 1972

[54] AIRCRAFT HAVING AUXILIARY AIRFOILS

[72] Inventor: John F. Mello, Hazelwood, Mo.

[73] Assignee: McDonnell Douglas Corporation, St. Louis, Mo.

[22] Filed: Dec. 29, 1969

[21] Appl. No.: 888,443

[52] U.S. Cl. ..................................244/46, 244/89
[51] Int. Cl. ............................B64c 3/08, B64c 5/10
[58] Field of Search............244/45, 45 A, 43, 46, 89

[56] References Cited

UNITED STATES PATENTS

| | | | |
|---|---|---|---|
| 3,292,881 | 12/1966 | Ricard | 244/46 |
| 3,572,617 | 3/1971 | Ricard | 244/46 |
| 3,489,375 | 1/1970 | Tracy | 244/46 |
| 2,601,962 | 7/1952 | Douglas | 244/89 X |
| 3,104,082 | 9/1963 | Polhamus | 244/46 |
| 3,478,989 | 11/1969 | Bielefeldt | 244/46 X |
| 2,430,793 | 11/1947 | Wells | 244/45 X |
| 3,203,650 | 8/1965 | Christenson | 244/46 |
| 2,924,400 | 2/1960 | Ruget | 244/46 |

FOREIGN PATENTS OR APPLICATIONS

| | | | |
|---|---|---|---|
| 813,568 | 5/1959 | Great Britain | 244/45 A |

*Primary Examiner*—Milton Buchler
*Attorney*—Gravely, Lieder & Woodruff

[57] ABSTRACT

An aircraft has a fuselage from which wings and horizontal stabilizers extend. At low speeds the lifting forces exerted by the airstream passing over the wings create a moment about the center of gravity for the aircraft, and that moment is offset by an opposite or trim force exerted on the horizontal stabilizers. At higher speeds the resultant of the lifting forces on the wings shifts rearwardly and thereby increases the moment about the center of gravity. At such speeds auxiliary airfoils extend from the fuselage to counteract the increased moment so that the trim force on the horizontal stabilizers does not become excessive. The auxiliary airfoils accordingly eliminate excessive static stability and the high drag and structural stresses associated with it.

4 Claims, 11 Drawing Figures

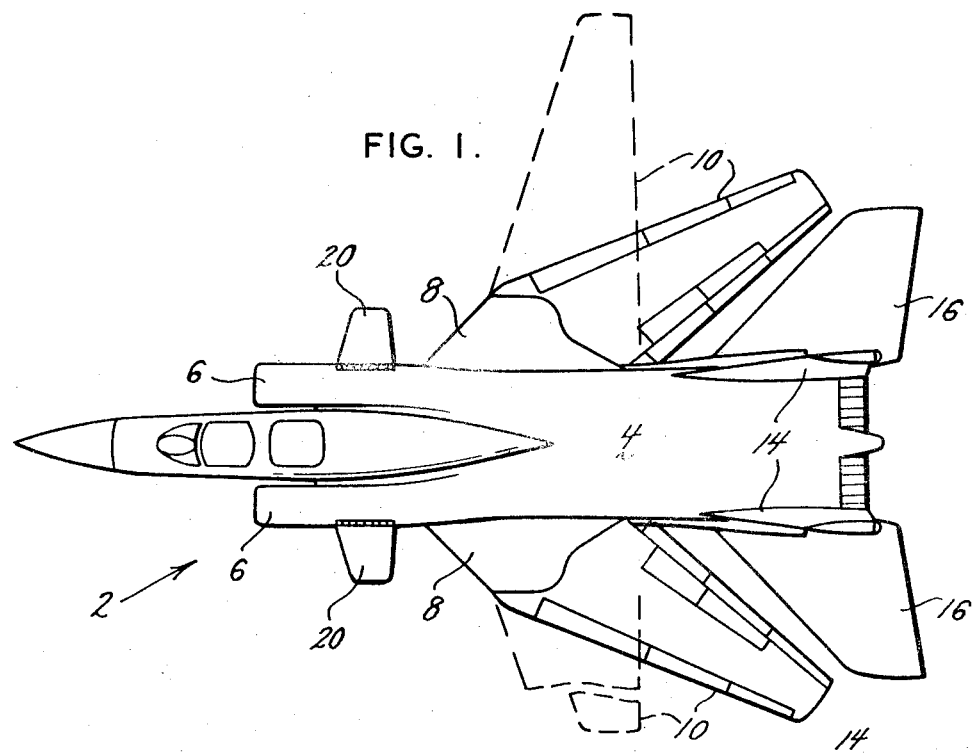
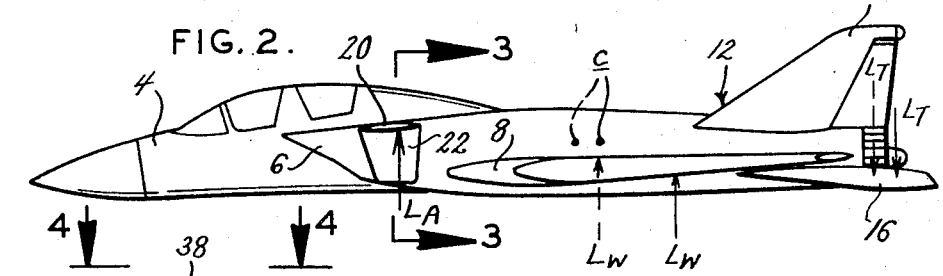
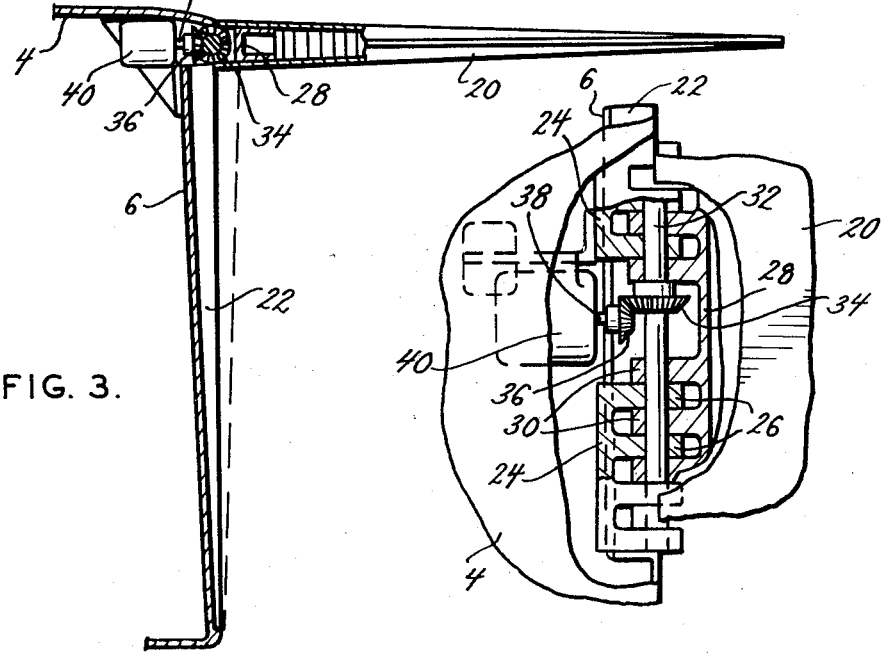

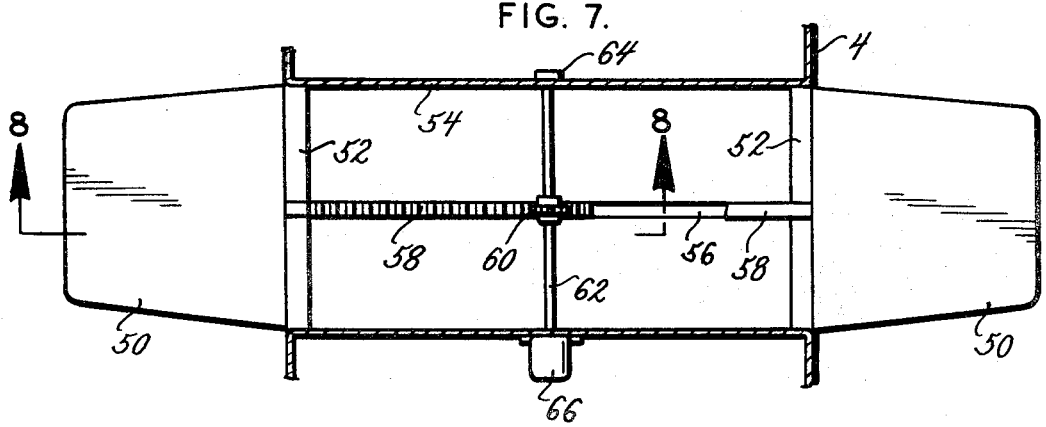
FIG. 7.
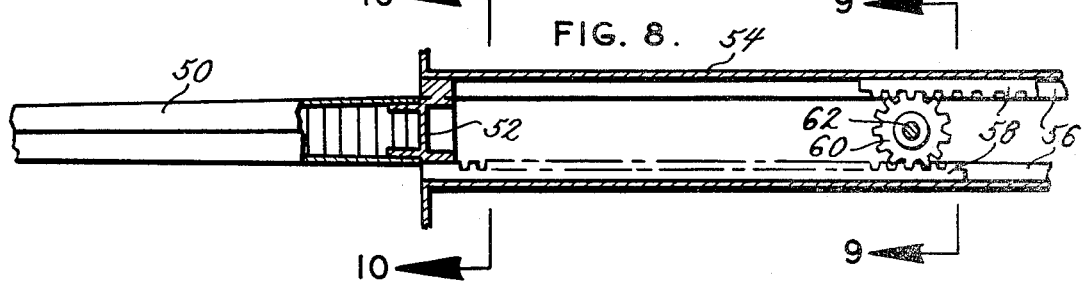
FIG. 8.
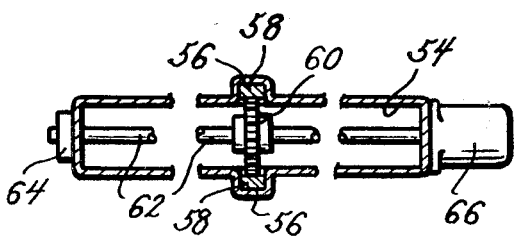
FIG. 9.
FIG. 10.
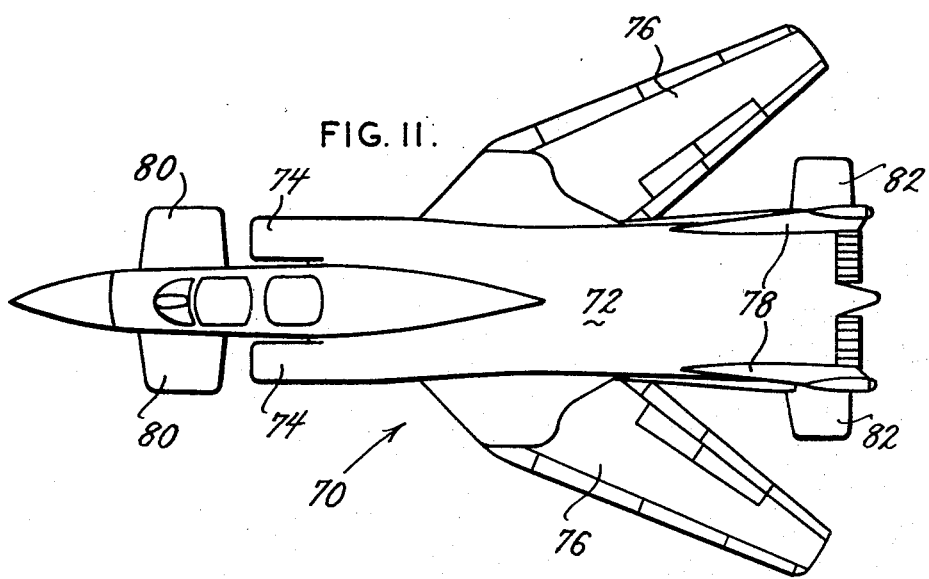
FIG. 11.

AIRCRAFT HAVING AUXILIARY AIRFOILS

BACKGROUND OF THE INVENTION

This invention relates in general to aircraft and more particularly to an aircraft having auxiliary airfoils for trimming it in high speed flight.

Variable or sweep wings on aircraft create relatively little drag in high speed flight, yet at lower speeds produce sufficient lift to enable aircraft to land safely on conventional runways. While the sweep wings solve the drag problem associated with high speed flight, at least insofar as the wings are concerned, or conversely the landing problem associated with high speed aircraft, they produce many other problems which offset the foregoing advantages and make the use of sweep wings a matter of marginal value.

The problems are for the most part created by the fact that the lifting forces on the wings shift rearwardly relative to the center of gravity for the aircraft as the wings sweep rearwardly from their forward position to their aft sweep position. Furthermore, the beneficial effects of sweep wings exist only at high subsonic and at supersonic speeds, but when any airfoil goes supersonic the lifting forces on it experience a natural shift to the rear. The rearward movement of the wings coupled with the natural aft shift phenomenon near the sonic velocity increases the distance between the resultant lifting force on the wings and the center of gravity for the aircraft. This creates an excessive margin of longitudinal static stability at high speeds. In other words, the increase in distance between the resultant lifting force on the wings and center of gravity produces a longer movement arm, requiring a larger trim force on the horizontal stabilizers to trim the aircraft.

In order to carry the increased trimming force necessary to offset the increased moment of the lifting forces on the wings, both the horizontal stabilizers and the tail portion of the fuselage must be strengthened, and this, of course, increases the weight of the entire aircraft. Moreover, since the trimming force acts downwardly in opposition to the lifting force, the lifting force must be increased to compensate for the increased down tail load at high speeds. This in turn requires stronger wings which increases the weight of the aircraft still further. Finally, the excessive margin of static stability existing at high speeds, that is to say the large trim force on the horizontal stabilizers, increases the drag significantly and further detracts from the maneuverability of the aircraft.

While the foregoing problems are not nearly so pronounced on fixed wing aircraft, they do exist due to the aft shift phenomenon experienced by the wings as they go supersonic.

SUMMARY OF THE INVENTION

One of the principal objects of the present invention is to provide an aircraft with an auxiliary airfoil having variable effectiveness so that unfavorably large static stability margins can be reduced and minimized. Another object is to provide an auxiliary airfoil of the type stated to counteract and thereby reduce the normal increase in the static stability margin associated with supersonic flight. A further object is to improve the performance of aircraft by controlling the level of static stability and thereby accruing reductions in drag and weight and achieving an increase in maneuverability. An additional object is to provide an auxiliary airfoil of the type stated for making the use of sweep wings on high performance aircraft practical by eliminating the disadvantages associated with such wings, but yet retaining the advantages afforded by them. These and other objects and advantages will become apparent hereinafter.

The present invention is embodied in an aircraft having the wings and horizontal stabilizers and in addition retractable auxiliary airfoils which counteract the increased moment generated by the resultant of the lift forces on the wings when the velocity of the aircraft increases. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts whenever they occur:

FIG. 1 is a top plan view of an aircraft provided with auxiliary airfoils constructed in accordance with and embodying the present invention;

FIG. 2 is a side elevation view of the aircraft showing the resultants of the forces acting on various lift surfaces thereof when the airfoils are extended;

FIG. 3 is a sectional view taken along line 3—3 of FIG. 2;

FIG. 4 is a fragmentary plan view, partially broken away and in section, taken along line 4—4 of FIG. 3;

FIG. 7 is a fragmentary sectional view taken transversely of an aircraft provided with modified auxiliary airfoils;

FIG. 8 is a sectional view taken along line 8—8 of FIG. 7;

FIG. 9 and 10 are sectional views taken along lines 9—9 and 10—10, respectively, of FIG. 8; and FIG. 11 is a plan view of an aircraft having its horizontal stabilizers ahead of its wings and auxiliary airfoils aft of the wings.

DETAILED DESCRIPTION

Figure 5:
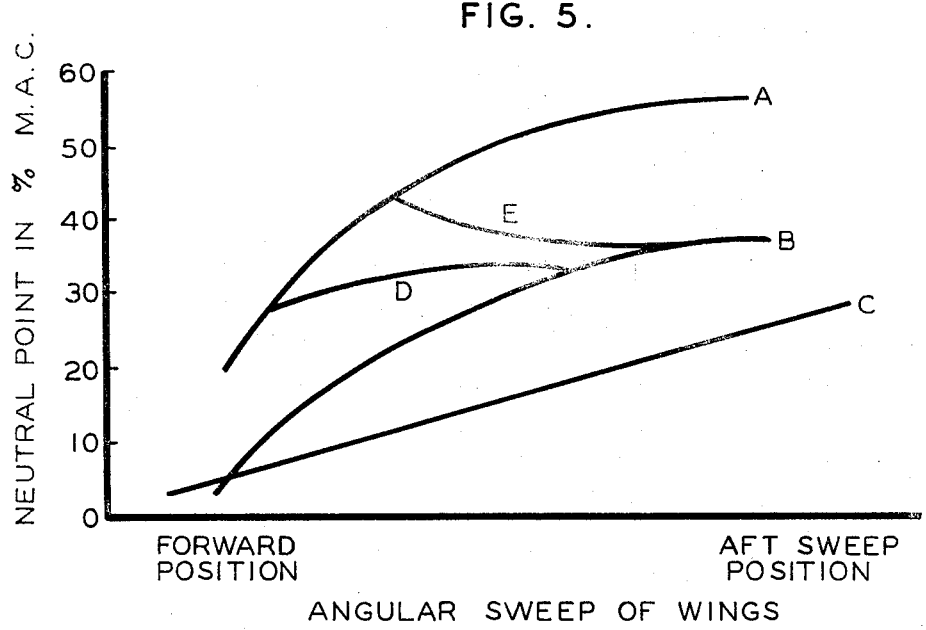
FIG. 5 is a graph showing the variation of the neutral point relative to the angle of sweep of the wings for an aircraft provided with the auxiliary airfoils.

Referring now in detail to the drawings, 2 designates an aircraft including a fuselage 4 having forwardly opening air intake ducts 6 for supplying combustion air to turbojet engines (not shown) housed within the fuselage 4 (FIGS. 1 and 2). To the rear of the intake ducts 6, the fuselage 4 has wing mounts 8 projecting laterally from it, and each wing mount 8 has a wing 10 or primary lifting surface hinged to it for swinging movement between a forwardly presented position (shown in dotted lines in FIG. 1) and a rearwardly presented aft sweep position (shown in full lines in FIG. 1). A suitable mechanism is provided for moving the wings 10 between their forward and their aft sweep positions while the aircraft 2 is in flight, but that mechanism does not form part of the present invention and therefore will not be described. The extreme end of the fuselage 4 forms a tail assembly 12 including a pair of vertical tails and rudders 14 and a pair of horizontal stabilizers 16.

The passage of the airstream over the wings 10 produces a lift across and along each wing 10, and the resultant $L_W$ of that lift is a force which is located to the rear of the center of gravity $c$ for the aircraft (FIG. 2). Thus, a moment is created about the center of gravity $c$ for the aircraft 2 with the moment arm being the longitudinal distance between the center of gravity $c$ and the point at which the resultant lifting force $L_W$ acts. When the wings 10 are in their forward position the force $L_W$ acts close to the center of gravity $c$ so the resulting moment is minimal (as indicated by the broken lead and force lines in FIG. 2). As the wings move from their forward to their aft sweep positions, the center of gravity $c$ for the aircraft 2 moves rearwardly a slight distance, but the resultant lifting force $L_W$ moves rearwardly by a considerably greater amount so that the net result is a much larger moment arm (as indicated by the full lead and force lines in FIG. 2). Consequently, the tendency of the resultant lifting force $L_W$ to pitch the aircraft 2 nose downwardly is even greater. When the aircraft 2 goes supersonic the resultant $L_W$ of the lifting forces on the wings 10 shifts still further rearwardly by reason of the natural aft shift phenomenon associated with airfoils subjected to supersonic airstreams. This compounds the aft shift created by movement of the wings 10 so that the total aft shift of the resultant force $L_W$ is quite large indeed (see full lead and force lines in FIG. 2).

In sweep wing aircraft of current design and construction, the enlarged moment is counteracted by constructing the horizontal stabilizers 16 such that in flight they exert a downwardly directed force $L_T$ on the tail of the fuselage 4 to maintain the trim of the aircraft. Of course, as the angle or sweep of the wings 10 increases and the aircraft goes supersonic the trim force $L_T$ will also increase, and this in turn increases the total lift $L_W$ which must be generated at the wings 10 in order to keep the aircraft airborne. Stated differently, the large downwardly directed forces on the horizontal stabilizers reduce the net positive lift ($L_W$- $L_T$). Consequently, the wings, horizontal stabilizers, and tail assemblies on sweep wing aircraft of current design are all reinforced and considerably heavier than their counterparts on fixed wing aircraft. The excess trim forces on the horizontal stabilizers of such aircraft which are due to the unusually large margins of static stability also result in a considerable increase in drag. Since the large downwardly directed forces on the horizontal stabilizers reduce the net positive lift, they also adversely affect the maneuverability of such aircraft at high speeds.

These disadvantages are overcome by installing auxiliary airfoils 20 (FIGS. 1–4) on the fuselage 4 forward of the center of gravity $c$ to decrease the static stability margin by assisting the horizontal stabilizers 16 in overcoming the increased moment created by the lifting force $L_W$ on the wings 10. These airfoils 20, moreover, can be moved inwardly and outwardly with respect to the fuselage 2 so that their effectiveness, or more specifically the lift $L_A$ provided by them, can be varied.

Referring now to FIGS. 1–4, the fuselage 2 has a pair of auxiliary airfoils 20 hinged to the outwardly presented walls of the inlet ducts 6 for movement about longitudinally extending axes from a fully retracted position to a fully extended position (FIG. 3). In the fully retracted or folded position each airfoil 20 fits into a recess 22 formed in the side wall of the corresponding duct 6 (FIG. 2 and 3). The recess 22 conforms to the shape of its corresponding airfoil 20 so that when folded each airfoil 20 is carried semisubmerged and has no affect on the flight characteristics of the aircraft 2. At the upper end of each recess 22, the side wall of the corresponding intake duct 6 has an outwardly projecting bracket 24 secured to it, and that bracket has a plurality of longitudinally spaced tines 26. The inner end of the airfoil 20 has a similar bracket 28 set into it and that bracket 28 likewise has tines 30 which fit intermediate the tines 26 of the bracket 24. The two brackets 24 and 28 are secured to one another by a hinge pin 32 which extends through the respective tines 28 and 30 thereof. The hinge pin 32 is merely journaled in the tines 26 but is splined or otherwise securely fastened to the tines 30. Thus, the hinge pin 32 moves or rotates with the airfoil 20. The center portion of the bracket 24 possesses an enlarged void through which the pin 32 extends, and within that void the hinge pin 32 is securely fitted with a beveled gear 34. The gear 34 meshes with another beveled gear 36 attached to the drive shaft 38 of a gear motor 40 which is mounted on the fuselage 2 at the upper end of the intake duct 6. The gear motors 40 for the two airfoils 20 may be either electrically or hydraulically powered, and further may be slaved to the wings 10 so that they will extend the auxiliary airfoils 20 when the wings 10 move rearwardly for high speed flight.

At low speeds such as those which may be encountered upon landing the aircraft 2, the wings 10 are in their forward position and the auxiliary airfoils 20 are fully retracted so as to have no affect on the flight characteristics of the aircraft 2. In this position maximum lift is provided and the resultant force $L_W$ generated by the airstream passing over the wing 10 acts to the rear of but relatively close to the center of gravity $c$ so that a moment is created which tends to pitch the nose of the aircraft 2 downwardly (FIG. 2, broken lead and force lines). To stabilize the aircraft and to offset the moment created by the resultant lift force $L_W$ the airstream passing over the horizontal stabilizers 16 exerts a downwardly directed trim force $L_T$ (FIG. 2, broken force line) at the tail 12 of the fuselage 4. By reason of the fact that the lift force $L_W$ acts close to the center of gravity $c$ and the opposing trim force $L_T$ acts through a relatively long moment arm, the trim force $L_T$ required to stabilize the aircraft 2 is quite small indeed and likewise so is the excess margin of static stability. Thus, the horizontal stabilizers 16 and the tail assembly 12 of the fuselage 4 need not be reinforced, to provide sufficient trim, stability, and maneuverability at lowe speeds. Since the static stability margin is low, drag is not significant.

On the other hand, when the aircraft 2 accelerates to high speeds in the vicinity of Mach 1 and higher, the wings 10 will be moved to their aft sweep position to reduce drag and as this occurs the entire body of each wing 10 moves rearwardly. This of course shifts the center of gravity $c$ of the aircraft 2 rearwardly a slight distance, but this distance is small compared to the shift in the resultant lift force $L_W$ created by those wings 10 so that the moment arm through which the force $L_W$ acts about the center of gravity $c$ is increased substantially (FIG. 2, full force and lead lines). Moreover, if the aircraft goes supersonic, as it most likely will when the wings 10 are shifted rearwardly, the displacement of the lift force $L_W$ is even more pronounced due to aft shift phenomenon associated with airfoils at supersonic velocities. Consequently, the moment arm through which the lifting force $L_W$ acts is considerably greater for the supersonic aft sweep position of the wings 10 than it is for the forward subsonic position. In fact, the moment is too large for the horizontal stabilizers 16 to offset or trim and leave large additional deflections for manuevering the aircraft 2.

To assist the horizontal stabilizers 14 in trimming the aircraft 2 at high speeds the airfoils 20 are extended as the wings 10 sweep rearwardly and these airfoils create a lifting force $L_A$ ahead of the center of gravity $c$. Thus, when the wings 10 assume their aft sweep position both the airfoils 20 and the horizontal stabilizers 16 effectively counteract the increased moment created by the shift in the resultant lift force $L_W$, and therefore the horizontal stabilizers 16 need not be more effective than is necessary to maintain trim and stability at low speeds.

Since the downwardly presented force $L_T$ on the horizontal stabilizers 16 is relatively small even at high speeds, the tail assembly 12 of the fuselage 4 does not carry large moments and therefore need not be extremely heavy in construction. Moreover, most of the lifting force $L_W$ exerted by the wings 10 is used to overcome the weight of the aircraft 2 and the inertial forces generated in maneuvering it. Consequently, the wings 10 need not be strengthened merely to compensate for an exceptionally large negative tail load $L_T$ as is true of conventional sweep wing aircraft. Indeed, the presence of the lifting force $L_A$ created by the extended airfoils 20 assists the wings 10 in supplying lift so that the wings 10 can be made lighter than those found on conventional sweep wing aircraft. For example, in a conventional sweep wing aircraft designed to withstand 6$g$'s in flight, the horizontal stabilizers may exert a negative lift or downward force of 3$g$'s, in which case the wings would have to be constructed to withstand 9$g$'s, that is the 6$g$'s experienced by the aircraft 2 in flight plus the 3$g$'s required to compensate the negative trim force of 3$g$'s. However, when auxiliary airfoils 20 are employed on a sweep wing aircraft 2 of the same 6$g$ rating, the horizontal stabilizers 16 may supply a negative lift of 1$g$ while the auxiliary stabilizers may provide a positive lift of 2$g$'s. In that case the wings would have to only withstand 5$g$'s to balance the forces on the aircraft 2 and to enable it to withstand 6$g$'s in flight. The foregoing examples are for illustrative purposes only, and represent an over simplification of the actual lift forces acting on an aircraft at high speeds. Nevertheless, they do illustrate that a lighter wing structure 10 may be used on sweep wing aircraft 2 having auxiliary airfoils 20. Consequently, sweep wing aircraft 2 having auxiliary airfoils 20 are considerably lighter than sweep wing aircraft constructed in the conventional manner.

Between the landing speed and the maximum speed for the aircraft 2, the auxiliary airfoils 20 are moved by the motors 40 between their fully retracted or submerged position and the fully extended position. The airfoils 20 are retracted at low speeds since the moment created by the resultant lift force $L_W$ on the wings 10 is relatively small and is effectively resisted by the negative lift force $L_T$ on the horizontal stabilizers. Moreover, the margin of static stability at low speeds 18 is relatively small, and therefore if the airfoils 20 were extended at such speeds, the moment about the center of gravity $c$ would be too large, making the aircraft unstable. For most sweep wing aircraft the wings 10 should move from their forward to their aft sweep position between 0.7 Mach and 0.9 Mach and likewise the auxiliary airfoils 20 should move from their retracted to their extended periods between the same velocities.

Figure 6:
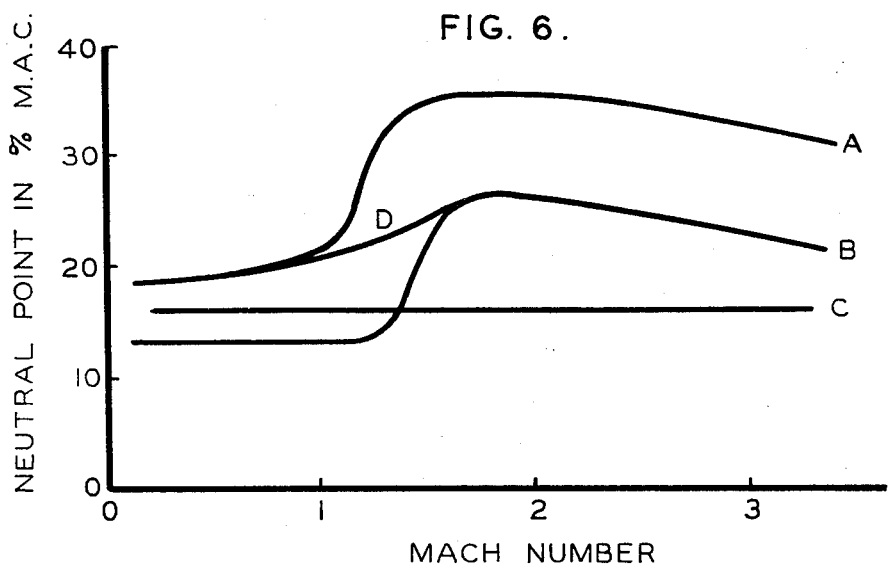
FIG. 6 is a graph showing the variation of the neutral point relative to the velocity for an aircraft provided with the auxiliary airfoils.

The operation of a typical aircraft 2 provided with airfoils 20 may be plotted graphically as illustrated in FIGS. 5 and 6. In FIG. 5 the sweep of the wings 10 is plotted along the abscissa, whereas the neutral point (N.P.) computed as a percentage of the mean aerodynamic chord (M.A.C.) for the wing 10 is plotted as the ordinate. The speed of the aircraft 2 is considered constant. The mean chord of the wing 10 represents the wing area divided by the wing span and of course that value remains constant, irrespective of the position or sweep of the wing 10. The neutral point is the distance from the leading edge of the mean aerodynamic chord on the wing 10 to the point at which the resultant stabilizing force produced by perturbations in flight attitude is felt, and that value changes or becomes larger as the wings 10 sweep rearwardly. Thus, the ordinate reflects the position at which the lifting force $L_W$ acts. Curve A shows the variation of the neutral point or in other words the position of the lifting force $L_W$ with respect to the wing sweep when the airfoils 20 are fully retracted. Curve B shows the same variation with the airfoils 20 fully extended. Curve C represents the position of the center of gravity $c$ for the aircraft 2, and it of course moves slightly rearwardly as the wings 10 shift to the aft sweep position. Curves D and E represent the effect of the airfoils 20 in two of many possible modes when they are moved between the fully retracted and fully extended positions concurrently with the rearward sweep of the wings 10.

Curve A illustrates that with the airfoils 20 fully retracted, the neutral point is always to the rear of the center of gravity $c$ so that the aircraft 2 will remain stable irrespective of the position of the wings 10. However, at low wing sweep the excess stability margin between the neutral point and the center of gravity $c$ is considerably less than at high speeds. Indeed, at low speeds the excess margin is sufficient to trim the aircraft 2 with moderate force $L_T$ on the horizontal stabilizers 16, whereas at high speeds the excess margin is so great that an excessive trim force $L_T$ is required on the horizontal stabilizers 16 to maintain trim, and this of course requires heavier structural members in the aircraft and further creates excessive drag.

Curve B on the other hand shows that the desired excess margin between the neutral point and the center of gravity $c$ exists at high speeds, but that at low speeds the excess margin diminishes and eventually the neutral point passes forwardly of the center of gravity $c$. The aircraft 2 should of course not be operated with the neutral point forward of the center of gravity $c$ (below the point of intersection for the curves B and C) for under those conditions the aircraft becomes unstable. Indeed, from the standpoint of safety the neutral point lines A and B should be somewhat above the line C for all operating conditions so that a positive static stability margin between the neutral point and the center of gravity $c$ always exists.

Curves D and E indicate two possible ways that the neutral point may be maintained to the rear of the center of gravity $c$ with a sufficient but not excessive static stability margin by commencing to extend the auxiliary airfoils 20 at selected wing sweep angles as the wings 10 sweep from their forward position to their aft sweep position. Thus, by coupling the operation of the airfoils 20 to the wings 10, the distance between the neutral point and the center of gravity $c$ is maintained approximately constant, notwithstanding the fact that the resultant lifting force $L_W$ shifts rearwardly. Moreover, the margin of static stability is not excessive so that excessive trim forces and the accompanying high drag does not occur at the horizontal stabilizers 16.

In the graph shown in FIG. 6 again the neutral point (N.P.) computed as a percent of the mean aerodynamic chord (M.A.C.) is plotted as the ordinate, whereas the speed is plotted as the abscissa. The wing sweep is considered constant so that this graph is also applicable to fixed wing aircraft provided with auxiliary airfoils 20. Curve A shows the variation of the neutral point with the speed when the airfoil is fully extended, whereas Curve B shows the same variation with the airfoil fully retracted. Line C represents the center of gravity which remains constant throughout all speeds for a fixed wing position. Finally, Curve D demonstrates one possible and perhaps the most desirable effect the airfoils 20 can have on the aircraft 2 as they shift from their fully retracted to their fully extending positions.

When the airfoils 20 are fully retracted and the aircraft is flying at relatively low speeds, the neutral point remains close to the line C but slightly above it as is apparent from the initial portion of Curve A. This indicates that a negative lift force $L_T$ is required on the horizontal stabilizers 14 to maintain trim or, in other words, that a margin of static stability exists. However, since Curve A is close to the line C at low speeds the margin is not large and the trim force $L_T$ need not be great. As the aircraft goes supersonic the lifting forces on the wing 10 tend to shift rearwardly due to the aft shift phenomenon previously mentioned so that the resultant force $L_W$ acts to the rear of its former position and exerts a greater moment about the center of gravity $c$. This increases the margin of static stability and is exemplified by the rise in the Curve A near Mach 1.

Curve B, on the other hand shows that when the airfoils 20 are extended and the aircraft is operating at low speeds the neutral point is ahead of the center of gravity $c$, making the aircraft 2 unstable. However, when the aircraft 2 goes supersonic the resultant lifting force $L_W$ on wing 10 shifts rearwardly, causing the neutral point to shift rearwardly past the center of gravity $c$ rather abruptly and then remain substantially in the same position slightly to the rear of the center of gravity $c$. Thus, the Curve B rises across and levels off above the line C or center of gravity $c$, and remains above the line C for most of the supersonic region, indicating that the margin of static stability and likewise drag is less at high speeds when the airfoils 20 are extended than when they are retracted. Consequently, in the supersonic region it is more desirable to operate the aircraft 2 along the Curve B, that is, with the airfoils 20 fully extended, since smaller forces $L_T$ are required at the horizontal stabilizers 16 to maintain trim.

The Curve D shows that desirable portions of both Curves A and B may be utilized by commencing to extend the airfoils 20 at the speed where the Curve A begins to rise sharply and having them reach their fully extended position at the speed where the Curve B levels off. When the airfoils 20 are extended and retracted accordingly the neutral point is always to the rear of the center of gravity $c$, but is never presented so far rearwardly as to require excessive forces on the horizontal stabilizers 16 to maintain trim. In other words, the margin of static stability never becomes excessive.

Since the wings 10 are assumed to remain in the same position insofar as the graph in FIG. 6 is concerned, that graph is more applicable to the use of auxiliary airfoils 20 on fixed wing aircraft. Nevertheless it does illustrate the aft shift phenomenon experienced by the resultant lifting force $L_W$ as the sweep wings 10 go supersonic.

Referring now to FIGS. 7-10, it is possible to provide the aircraft 2 with modified auxiliary airfoils 50 which are very similar to the airfoils 20, but telescope into and out of the fuselage 4 instead of swinging relative to it.

Each airfoil 50 at its inner end is attached to a slide 52 which fits into a rectangular slideway 54 extending transversely of the fuselage 4 preferably ahead of the air intake ducts 6. The slideway 54 has a pair of opposed upper and lower recesses 56 extending substantially the entire length thereof, and each recess 56 contains a rack 58 which is slidable therein transversely of the fuselage 4. Each rack 58 is attached at its one end to the slide 52 of a different airfoil 50 so that the airfoils 50 move with the racks 58.

At the center of the slideway 54 the racks 58 are engaged by a single pinion gear 60 which is interposed between them, and the pinion gear 60 in turn is splined or otherwise secured to a shaft 62. One end of the shaft 62 is journaled in a bearing 64 which is attached to one of the end walls of the slideway 54, while the other end of the shaft 62 is connected to a gear motor 66 which is secured to the opposite end wall of the slideway 54. The gear motor 66 may be either electrically or hydraulically powered.

When the motor 66 is energized the gear 60 will rotate and drive both racks 58 either inwardly or outwardly, depending on the direction of rotation. Since the airfoils 50 are attached to the racks 58 through their slides 52, they are moved into and out of the fuselage 4 by the motor 66. When the airfoils 50 are retracted into the slideways 54 they of course have no affect on the flight characteristics of the aircraft 2. However, when the airfoils 50 are extended outwardly beyond the ends of the slideway 54 they, like the airfoils 20, exert a lifting force on the fuselage 4 ahead of the center of gravity $c$. The airfoils 50 may be locked anywhere between their fully extended and fully retracted position, and the lifting force $L_A$ imposed by them is altered accordingly. Like the gear motor 40, the gear motor 66 should be operated in conjunction with the sweep of the wings 10 so that a predetermined relationship exists between the angular position of the wings 10 and the amount of lateral extension for the airfoils 50.

The airfoils 50 afford the same advantages as the airfoils 20, and therefore they will not be described in further detail.

Referring now to FIG. 11, it is possible to utilize auxiliary airfoils similar to the airfoils 20 and 50 on an aircraft 70 of the canard variety. The aircraft 20 includes a fuselage 72, intake ducts 74, swing-type wings 76, and vertical tails and rudders 78. The fuselage 72 is also provided with a pair of horizontal stabilizers 80, but the stabilizers are located forward of the wings 76 and center of gravity as well as ahead of the intake ducts 74, and not aft of the wings 76 and center of gravity as is true of the horizontal stabilizers 16. Thus, to trim the aircraft 70, the horizontal stabilizers 80 must be configured to normally exert upwardly directed trim force on the fuselage 72.

At the aft end of its fuselage 72 the aircraft 70 is also provided with auxiliary airfoils 82 which extend and retract, either telescopically like the airfoils 50 or in with a swinging motion like the airfoils 20. These airfoils 82 extend near the sonic velocity for the aircraft 70 and are configured to exert a downwardly directed force on the fuselage 72 to offset the greater moment exerted by the resultant lifting force $L_T$ on the wings 76, as the wings 76 sweep rearwardly and as the wings 76 go supersonic. In all other respects, the auxiliary airfoils 82 function similar to the airfoils 20 and 50, and consequently they will not be discussed in further detail.

While the foregoing discussion has been devoted almost exclusively to sweep wing aircraft 2 and the relationship between the airfoils 20, 50 or 82 and the angle of the wings, it should be noted that the airfoils 20, 50 or 82 are also beneficial to fixed wing aircraft having supersonic flight capabilities. This results from the aft shift phenomenon associated with airfoils, such as the wings, as the airstream passing over then goes supersonic. In other words, when an aircraft exceeds the speed of sound, the resultant $L_W$ of all the lifting forces on each wing moves rearwardly away from the center of gravity irrespective of whether or not the wings sweep. The detrimental effects of this aft shift are best illustrated by Curve A in the graph shown in FIG. 6. Thus, fixed wing aircraft possess the same disadvantages as sweep wing aircraft, although those disadvantages are not nearly so pronounced. In any event, the disadvantages may be obviated by incorporating the auxiliary airfoils 20, 50 or 82 into such fixed wing aircraft. In fixed wing applications the movement of the airfoils 20, 50 or 82 should be related to the speed of the aircraft with the greatest movement occurring as the aircraft goes supersonic.

This invention is intended to cover all changes and modifications of the example of the invention herein chosen for purposes of the disclosure which do not constitute departures from the spirit and scope of the invention.

What is claimed is:

1. An aircraft comprising a fuselage, wings mounted on and projecting from the fuselage for supplying lift to the aircraft, the wings being pivotally mounted on the fuselage for swinging movement between a forwardly disposed position wherein the included angle between the wings and the fuselage is relatively large and rearwardly disposed aft sweep positions wherein the included angle between the wings and the fuselage is smaller; the resultant of the lifting forces exerted by the wings being to the rear of the center of gravity for the aircraft irrespective of the position of the wings and being located further rearwardly in the aft sweep position than in the forward position, whereby the lift forces on the wings create a nose-down moment about the center of gravity; horizontal stabilizers projecting laterally with respect to the fuselage forwardly of the wings and center of gravity and being spaced longitudinally from the wings, the horizontal stabilizers being positioned and configured to produce a moment about the center of gravity which is in opposition to the nose-down moment created by the wings; and auxiliary airfoils mounted on the fuselage behind the wings and being spaced longitudinally from the wings and the horizontal stabilizers, the auxiliary airfoils being positioned and configured to produce a moment about the center of gravity which opposes the nose-down moment exerted by the wings and supplements the moment exerted by horizontal stabilizers, the auxiliary airfoils being retractable so that the moment produced thereby can be varied; whereby as the wings move rearwardly from their forward position to aft sweep positions the auxiliary airfoils may be extended to counteract the increase in the nose-down moment exerted by the wings so that the load on the horizontal stabilizers does not become excessive.

2. An aircraft according to claim 1, wherein two auxiliary airfoils are provided and each is hinged to the fuselage for movement from a retracted position wherein the airfoils are generally against the fuselage to an extended position wherein the airfoils project generally laterally from the fuselage.

3. An aircraft according to claim 1, wherein two auxiliary airfoils are provided and each is slidably mounted in the fuselage; and wherein the airfoils are contained substantially within the fuselage when retracted and project laterally from the fuselage when extended.

4. An aircraft according to claim 1, wherein the movement of the auxiliary airfoil is responsive to the movement of the wings, the auxiliary airfoil being retracted when the wings are in their forward position and being extended when the wings are in their aft sweep position.

* * * * *